United States Patent [19]

Flesher et al.

[11] Patent Number: 4,506,062

[45] Date of Patent: Mar. 19, 1985

[54] INVERSE SUSPENSION POLYMERIZATION PROCESS

[75] Inventors: Peter Flesher; Adrian S. Allen, both of Bradford, England

[73] Assignee: Allied Colloids Limited, Bradford, England

[21] Appl. No.: 519,610

[22] Filed: Aug. 2, 1983

[30] Foreign Application Priority Data

Aug. 9, 1982 [GB] United Kingdom ............... 8222932

[51] Int. Cl.³ ............................ C08F 2/32; C08F 2/18
[52] U.S. Cl. ................................. 526/211; 526/219; 526/222; 526/225; 526/209; 526/213; 526/216; 526/220
[58] Field of Search ............... 526/211, 193, 219, 222, 526/225, 201

[56] References Cited

U.S. PATENT DOCUMENTS

| | | | |
|---|---|---|---|
| 2,772,310 | 11/1956 | Morris | 526/217 |
| 3,484,375 | 12/1969 | Guziak | 526/193 |
| 3,763,120 | 10/1973 | Atkins | 526/201 |
| 3,857,824 | 12/1974 | Atkins | 526/217 |
| 4,166,152 | 8/1979 | Baker et al. | 526/201 |

FOREIGN PATENT DOCUMENTS

| | | | |
|---|---|---|---|
| 0004062 | 6/1979 | European Pat. Off. | 526/193 |
| 5778937 | 5/1972 | Japan | 526/193 |
| 50-98990 | 8/1975 | Japan | 526/211 |
| 56-135501 | 10/1981 | Japan | 526/201 |
| 57-74308 | 5/1982 | Japan | 526/201 |
| 58-52302 | 3/1983 | Japan | 526/209 |
| 1133328 | 11/1968 | United Kingdom | 526/201 |
| 1482515 | 8/1977 | United Kingdom | 526/211 |

*Primary Examiner*—Joseph L. Schofer
*Assistant Examiner*—Peter F. Kulkosky
*Attorney, Agent, or Firm*—Lawrence Rosen

[57] ABSTRACT

A reverse phase suspension polymerization process conducted using an ionic polymerizable material and a polymerization stabilizer of opposite ionic or potentially ionic charge is modified by including also a water soluble, substantially oil insoluble, ionic non-polymerizable compound having the same charge type as the polymerizable material and having at least one alkyl group containing at least 6 carbon atoms.

9 Claims, No Drawings

INVERSE SUSPENSION POLYMERIZATION PROCESS

It is known to make a dispersion of aqueous particles of water soluble polymer in a non-aqueous liquid by forming a dispersion in the non-aqueous liquid of droplets of aqueous monomer in the presence of emulsifier and/or stabiliser and then polymerising the monomer. This is called reverse phase polymerisation. If the polymerisation occurs primarily within the monomer droplets the polymerisation is called a reverse phase suspension polymerisation. If monomer migrates from the droplets into micelles of emulsifier in the non-aqueous liquid and polymerises in the micelles then the process is a reverse phase emulsion polymerisation process. Early disclosures of such processes are to be found in, for instance, U.S. Pat. Nos. 2,982,749 and 3,284,393.

This invention is concerned particularly with problems that arise during reverse phase suspension polymerisation. This is normally conducted using a polymeric suspension stabiliser, for instance, a copolymer of hydrophilic and hydrophobic groups and which is soluble or dispersible in the non-aqueous liquid and is substantially insoluble and non-dispersible in water, for instance, as described in British Patent Specification No. 1,482,515. A small amount of an oil soluble surfactant may be included to facilitate the formation or the maintenance of the suspension.

It is well known that certain problems of reproducability arise when the monomer includes ionic monomer, for instance, when co-monomer solutions of acrylamide and quaternary ammonium derivatives or inorganic acid salts of dimethylaminoethyl acrylate or methacrylate and comonomer solutions of acrylamide and acrylic acid or its sodium or ammonium salts are subjected to reverse phase suspension polymerisation. In particular it can be difficult to obtain reproducibly particles having the desired spherical shape and having a narrow size distribution. Irregular particle shape and wide particle size distribution are undesirable for a number of reasons. Spherical and uniform particle size is then particularly desirable in order to avoid settlement of the larger particles and variation in the viscosity of the final dispersions. If the dispersion contains a large amount of particularly fine particles then it will have a much higher viscosity than would otherwise be the case, and this can be very undesirable. If the particle size range is particularly wide then there is increased risk of coagulation occurring during polymerisation or during subsequent treatment of the resultant dispersion.

It has been our object to devise a process that permits closer control of the particle shape and size distribution.

A reverse phase suspension polymerisation process according to the invention is one in which an aqueous solution of polymerisable material is dispersed as droplets in a water immiscible liquid containing a suspension polymerisation stabiliser and the polymerisable material is polymerised in the droplets to form a dispersion in the non-aqueous liquid of aqueous polymer droplets and in which the stabiliser is ionic or potentially ionic, the polymerisable material comprises polymerisable material that is ionic with a charge type opposite to that of the stabiliser and the dispersion of the said aqueous solution of polymerisable material into the water immiscible liquid is conducted in the presence of a water soluble, substantially oil insoluble, ionic, non-polymerisable compound having the same charge type as the ionic polymerisable material and containing at least one alkyl group of at least 6 carbon atoms.

We have surprisingly found that the inclusion of these defined water soluble polar, ionic, organic compounds prior to droplet formation gives greatly improved control over particle size distribution and over particle shape and eliminates or minimises the risk of aggregation or coagulation compared to the use of suspension polymerisation stabilisers alone.

It might have been expected that combination of the ionic (or potentially ionic) polymerisation stabiliser with the oppositely charged ionic additive would result in less efficient stabilisation, perhaps due to neutralisation of the charges in the stabiliser. It is also surprising that these particular water soluble ionic additives give improved results in the defined water-in-oil system since some of them are often used to promote the formation and stabilisation of oil-in-water dispersions.

It seems that the surprising results obtainable in the invention may be interpreted as being due to the formation of a stable interionic complex that is a more effective polymerisation stabiliser than the conventional stabiliser used alone. This complex, if it exists, presumably is a complex between the water soluble ionic additive and the conventional polymerisation stabiliser and is presumably formed at the interface of the aqueous particles, initially of monomer but eventually of polymer gel. However, we do not wish to be bound by theory.

The invention is of particular value in the production of high molecular weight, water soluble homopolymers of quaternary ammonium derivatives or inorganic acid salts of dialkylaminoalkyl-acrylates or -methacrylates, dialkylaminoalkyl-acrylamides, their copolymers with acrylamide, and homopolymers of acrylic acid and its sodium or ammonium salts and their copolymers with acrylamide. The polymerisable material that is used for forming the aqueous solution is therefore preferably the monomer or blend of monomers necessary for forming such polymers and in particular the ionic polymerisable material is preferably an inorganic salt or quaternary ammonium salt of a dialkylaminoalkyl-acrylate or is acrylic acid. Other known anionic or cationic monomers of ethylenically unsaturated compounds may be used.

The continuous phase for these suspension polymerisations is a liquid which is immiscible with the aqueous monomer and may include aliphatic or aromatic hydrocarbons, chlorinated hydrocarbons, higher alkyl glceride esters or any suitable liquid or liquid mixture known in the art. The preferred continuous phase is a liquid aliphatic hydrocarbon or mixture of aliphatic hydrocarbons. However, other additional liquids may be used at some stage of the process to provide benficial properties particularly to dispersions of small polymer particles in liquids.

The reverse phase suspension polymerisation stabiliser is required to prevent or minimise the agglomeration of particles during the course of polymerisation. Suitable materials are well known and include copolymers of hydrophobic monomers with hydrophilic monomers which are soluble or dispersible in liquids of low polarity. The preferred stabilisers are either completely soluble or form fine dispersions in the continuous phase but are substantially insoluble in the monomer solution and do not form micelles in the continuous phase. These are typified by copolymers of alkyl acrylates or methacrylates with acrylic or methacrylic acid and copolymers of alkyl acrylates or methacrylates with dimalkyl amino alkyl-(generally dimethyl aminoethyl-)acrylate methacrylate or quaternary ammonium or acid salt derivatives of these amino monomers. The most suitable of these are copolymers of alkyl methacrylates, where the alkyl group is a linear hydrocarbon of 12-18 carbon atoms, with methacrylic acid or trimethyl-β-methacryloxyethyl-ammonium chloride and terpolymers with methyl methacrylate and hydroxyethylacrylate. Suitable materials are described in British Patent Specification No. 1,482,515.

The amount of suspension polymerisation stabiliser used is dependent on the size range of polymer particles required because at least a mono-layer adsorbed at the interface between the aqueous polymer particle and the continuous phase is required to minimise the degree of agglomeration and coagulation during polymerisation. As the polymer particle size is decreased, the interfacial area is increased and therefore a higher concentration of stabiliser is required. Generally, for the production of large particles (in the size range 50 to 1000 microns) the amount of stabiliser used is from 0.01 to 0.5%, preferably 0.03 to 0.2%, on weight of the aqueous polymer particles. For small particles in the size range 0.2 to 5 microns 0.05 to 10%, preferably 0.5 to 5%, based on the weight of aqueous polymer particles is used. The particle size is selected within the preferred range of 0.2 to 1000 microns by appropriate choice of the degree of agitation, and is also dependent on the stabiliser and other materials used.

The choice of stabiliser used is dependent on the particular homo-polymer or copolymer being manufactured. The stabilisers for polymers containing acrylic acid or its sodium salt are cationic and those for polymers containing dimethylaminoethyl-acrylate or its salts or quaternary ammonium derivatives are anionic.

When the monomer is cationic the ionic additive should also be cationic and suitable additives are compounds of the formula

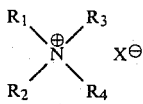

where
$R_1 = C_6-C_{18}$ alkyl and $C_{8-18}$ alkyl substituted benzyl
$R_2 = H$, $CH_3$, benzyl or, if $R_1$ is $C_6-C_{12}$ alkyl, $C_2-C_{12}$ alkyl
$R_3$ and $R_4 = H$, $CH_3$, benzyl or $(CH_2CH_2O)_nCH_2CH_2OH$ where $n = 0-15$
x is an anion derived from quaternisation or salt formation, for example, chloride, bromide, sulphate, methosulphate, ethosulphate, acetate and phosphate.

$R_1$ preferably contains at least 10 carbon atoms and generally should contain at least 12 carbon atoms.

Preferred materials are triamylmethyl-ammonium methosulphate, decyl dimethyl-ammonium methosulphate, coco-trimethyl-ammonium chloride, 1-hydroxyethyl 1-methyl 2-dodecyl imidazolinium chloride and caprylamidopropyl trimethylammonium methosulphate.

When the monomer is anionic, suitable anionic additives for use in the invention are compounds of the formulae

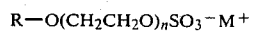

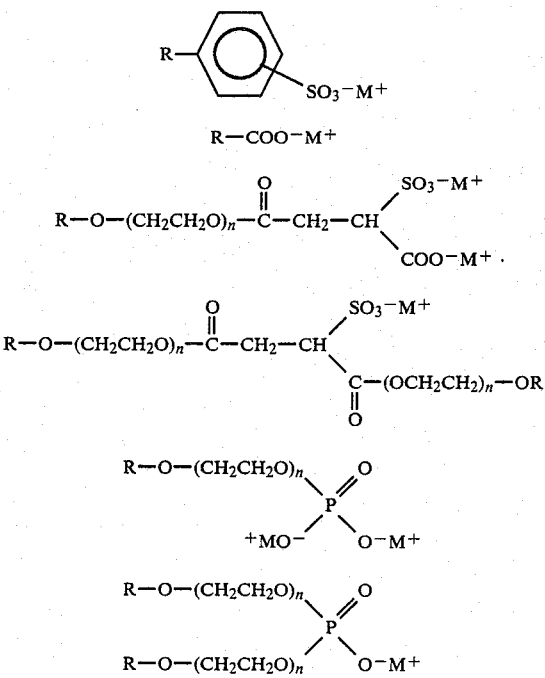

where
$R = C_6-C_{18}$ alkyl or alkyl substituted benzene
$n = 0-15$
$M = Na$, $K$, $Li$, $NH_4$ or a lower aliphatic amine or hydroxyethyl amine.

Particularly preferred compounds are sodium 2-ethylhexyl sulphate, sodium isodecyl sulphate, sodium lauryl sulphate and disodium dodecyl sulphosuccinate.

Any polar ionic organic compound which is soluble in the aqueous monomer but insoluble in the continuous phase, in combination with a counterionic suspension polymerisation stabiliser and which promotes the formation of uniform shaped spherical polymer particles with a narrow particle size distribution and does not cause inversion or destabilisation of the phases prior to or during polymerisation, can be used.

The amount of the polar ionic organic compound used depends on the chemical type, the polymer particle size range being produced and the amount and type of counterionic suspension polymerisation stabiliser used. Generally, the amount used will lie within the range 0.003% to 0.1% preferably 0.005 to 0.05% by weight of aqueous monomer for particle sizes in the range 50 to 1000 microns in diameter where from 0.01% to 0.5% by weight on weight of aqueous monomer of suspension polymerisation stabiliser is used, and within the range of 0.02% to 5.0% preferably 0.2 to 2% by weight on weight of aqueous monomer for particle sizes in the range 0.2 to 5 microns in diameter where from 0.05% to 10% by weight of aqueous monomer of suspension polymerisation stabiliser is used. The ratio by weight of stabiliser:ionic additive is often in the range 1:0.03 to 1, but preferably is above 1:0.08.

Preferably the amount of polar ionic organic additive is such that it does not neutralise all the charges on the suspension stabiliser, since if too much of the ionic organic additive is included there is a danger of phase reversal or coagulation. Experimentation will show the desired proportion of ionic additive:stabiliser. Generally, the amount of ionic additive is such as to neutralise from 20 to 95%, most preferably 40 to 80% of the ionic groups of the stabiliser. However, when the additive and the monomer are anionic it is possible to obtain satisfactory results with greater amounts of the additive, for instance in amounts greater than the amounts required to neutralise all the ionic groups of the stabiliser. Thus, satisfactory results are obtained, without coagulation, when the amount of sodium lauryl sulphate or other anionic additive is a large excess over the stoichiometric amount required to neutralise the ionic groups of the stabiliser.

We find generally that the ionic additives having chain lengths of 12 carbon atoms or more are preferred in many instances but that additives having shorter chain lengths are suitable in some processes, especially when the suspension has a relatively high concentration of ionic monomer. For instance, when the polymerisable material is 70% sodium acrylate and 30% acrylamide satisfactory results are achievable with ionic additives having alkyl chain lengths as low as 8 carbon atoms or even as low as 6 carbon atoms, whilst when the amount of sodium acrylate is reduced to 40% it is desirable to increase the chain length in the alkyl group of the additive, for instance to 10, and preferably to 12 carbon atoms or more.

The water soluble polar ionic compound must not polymerise and must be substantially insoluble in the non-aqueous continuous phase. If it was substantially soluble in that phase there would be a tendency for micelles to form and for a reverse phase emulsion polymerisation to occur. This is known to cause the formation of very small polymer particles, for instance below 0.2 microns.

The kinetics of the polymerisation process of the invention are typical of solution or suspension polymerisations and are characterised by the fact that the polymer particle size distribution and shape are totally dependent upon the initial size range and shape of the droplets. This is in contrast to emulsion polymerisation kinetics where the size range is independent of initial droplet size. Emulsion polymerisation kinetics results in the production of a product in the form of an emulsion having a viscosity which is liable to be very much higher than the viscosities obtained in the invention even when the suspension contains a high polymer concentration.

The ionic additive is preferably included in the aqueous solution of polymerisable material before that is dispersed into the water immiscible liquid. However, it may sometimes be possible to introduce the additive to the non-aqueous phase separately from the aqueous solution, for instance prior to or simultaneously with the dispersion of the aqueous solution into the non-aqueous phase.

Polymerisation of the monomer solution droplets may be effected by any of the techniques commonly used to polymerise water soluble ethylenic unsaturated monomers such as the use of free radical yielding initiators in the absence of oxygen. Typical are redox couples such as potassium bromate with sulphur dioxide, tert-butyl hydroperoxide with ferrous complexes of oligoethylene oligoamines and thermal initiators such as potassium persulphate, 2,2'-azobis(2-amidinopropane) hydrochloride or 2,2'-azobiscyanoualeric acid. The preferred free radical yielding initiators are those which are soluble in the aqueous monomer solution.

Photoinitiation, X-ray or γ-ray initiation procedures may also be acceptable techniques for producing radicals in the droplets.

The process is generally conducted in the absence of emulsifying agent.

By the process described in this invention large polymer particles of narrow particle size distribution within the range 50 to 1000 microns in diameter but preferably 100 to 500 microns in diameter having a regular spherical shape can be made. The polymer gel particles so formed can be dehydrated by azeotropic evaporation followed by any suitable solid-liquid separation process, such as filtration, to yield substantially dry, dust free polymer beads which have outstanding physical properties. These can be readily dissolved in water by adding the beads to agitated water to give solutions of polymer.

Smaller regular spherical polymer particles can be made by the described process having narrow particle size distributions within the range 0.2 to 5 microns in diameter but preferably 0.2 to 2 microns in diameter. Polymer gel particles of this size are not generally isolated as solids due to their tendency to easily form dust clouds, their tendency to form agglomerates on contact with water and their very low bulk densities. It is more useful for such polymer gel particles to be formulated as free flowing liquid dispersions in non-aqueous liquid. Such liquid dispersions of gel particles can be prepared by the techniques described in this invention containing up to 40% polymer on a dry basis by weight. Additionally the dispersions may be azeotropically dehydrated to give liquid dispersions in oil containing up to 70% dry polymer by weight. The low viscosity and high active polymer content of these dispersions render them most economic and easy to use. In all azeotropic evaporation processes for the dehydration of polymer gel particles there is a great risk of coagulation and agglomeration of the particles taking place. An important feature of the invention is that the combination of water soluble polar organic compound with the water insoluble suspension stabiliser imparts improved stability of the suspension during azeotropic evaporation of the water content and prevents the coagulation and agglomeration of the polymer particles.

The described dispersions of either hydrated or dehydrated polymer may be rapidly converted to aqueous polymer solutions by addition of the dispersion to water with appropriate agitation. Additionally, suitable oil in water emulsifiers may be added to the dispersions to render the continuous phase more readily dispersible in water thereby more easily releasing the polymer particles into the water to form an aqueous polymer solution.

EXAMPLE 1

An aqueous monomer solution comprising acrylamide (46.8 grams), trimethyl-β-acryloxyethylammonium chloride (80.3 gms), tetrasodium ethylenediaminetetraacetate (0.03 gms), potassium bromate (0.032 gms) and water (81.2 gms) was prepared and the pH of the solution adjusted to 4.0.

A non-aqueous continuous phase was prepared comprising Shell SBP11 (300 gms) and a 1:3 molar ratio copolymer of ceto-stearyl methacrylate and methacrylic acid as stabiliser (0.02 gms).

The continuous phase was transferred to a 700 ml capacity resin pot and deoxygenated by bubbling nitrogen gas through the liquid via a gas diffusion tube whilst stirring with a small bladed propeller type stirrer at 1000 r.p.m.

The monomer solution was then added to the agitated continuous phase and allowed to disperse for 3 minutes during which time the temperature of the suspension was adjusted to 25° C. The suspension was then initiated by introducing a solution of $SO_2$ in SBP11 (6.5 mls of 1% wt./vol. solution).

When the exothermic reaction was completed, water was azeotroped off the suspension under reduced pressure at 80° to 90° C. The resulting suspension of polymer beads was cooled to 25° C. filtered and the beads finally dried using a fluid bed drier for 30 minutes at 80° C.

The polymer beads produced had a particle size distribution ranging from 200 microns to 2500 microns and more than 70% of the particles were grossly misshapen oblate spheroids.

EXAMPLE 2

The same recipe and procedure used in Example 1 was used except coco-trimethylammonium methosulphate (0.02 gms) was added to the monomer solution prior to suspension in the hydrocarbon continuous phase.

The polymer beads produced had a particle size distribution ranging from 200 microns to 750 microns and less than 5% of the particles were misshapen showing a very marked improvement in properties compared to beads produced in the absence of coco-trimethylammonium methosulphate as given in Example 1.

EXAMPLE 3

An aqueous monomer solution comprising acrylamide (98 gms), trimethyl-$\beta$-acryloxyethylammonium chloride (70 gms), penta-sodium diethylenetriamine pentaacetate (0.2 gms) and water (212 gms) were prepared and the pH of the solution adjusted to 4.8.

A non-aqueous continuous phase comprising Solvent Pale 60 oil (115.6 gms), Shell SBP11 (150 gms) and a 2:1 molar ratio copolymer of ceto-stearyl methacrylate and methacrylic acid as stabiliser (11.4 gms) was prepared.

The suspension was produced by adding the aqueous monomer solution to the hydrocarbon continuous phase with high shear mixing using a Silverson type L2R laboratory mixer. Mixing was continued for 15 minutes and then the temperature of the suspension was adjusted to 20° C.

The suspension was transferred to a 700 ml resin pot and deoxygenated using nitrogen gas flowing at 200 mls per minute through a gas distribution tube immersed in the suspension. The nitrogen flow was continued for 30 minutes with the suspension agitated throughout using a four blade propeller type stirrer revolving at 1000 r.p.m. Tertiary-butyl hydroperoxide was then added (0.00255 gms) followed by sodium sulphite (0.002 gms) dissolved in water (6 gms) added continuously over a period of 40 minutes to effect polymerisation.

The resulting polymer gel suspension was then distilled under reduced pressure up to a temperature of 95° C. to remove water and volatile hydrocarbons to prepare a dispersion of polymer in oil containing 0.8% by weight of water and 54.8% by weight of polymer on a dry basis.

EXAMPLES 4-10

Polymer dispersions were prepared by the method given in Example 3 using various amounts of stabiliser in the continuous phase and various amounts of coco-trimethylammonium methosulphate (CTMAM) added to the aqueous monomer solution prior to dispersion.

| Example No. | Weight of Stabiliser used (gms) | Wt. of CTMAM used (gms) |
|---|---|---|
| 4 | 11.4 | 0.38 |
| 5 | 11.4 | 0.95 |
| 6 | 11.4 | 1.90 |
| 7 | 11.4 | 3.80 |
| 8 | 5.7 | 1.71 |
| 9 | 3.8 | 0.76 |
| 10 | 0 | 3.80 |

Polymer dispersions were obtained in Examples 4–9. No polymer dispersion was obtained for Example 10 since in the absence of stabiliser an oil in aqueous monomer solution dispersion was formed which on polymerisation formed a gel with droplets of oil dispersed therein.

EXAMPLE 11

Samples of the dispersions from Examples 3–9 were centrifuged at 1,250 g for 30 minutes as an accelerated settlement test and the degree of settlement determined by weighing the sediment.

| Example No. | Concentration of Stabiliser (% on weight of aqueous monomer droplets) | Concentration of CTMAM (% on weight of aqueous monomer droplets) | Solids separated on centrifuge (% of total solids) |
|---|---|---|---|
| 3 | 3 | 0 | 66.2 |
| 4 | 3 | 0.1 | 61.0 |
| 5 | 3 | 0.25 | 47.0 |
| 6 | 3 | 0.5 | 33.0 |
| 7 | 3 | 1.0 | 18.0 |
| 8 | 1.5 | 0.45 | 47.4 |
| 9 | 1.0 | 0.20 | 57.6 |

EXAMPLE 12

Samples of the dispersions from Examples 3–9 were examined under an electron microscope and particle size range assessed and particle shape observed.

Particle size ranges of dispersions prepared with both stabiliser and CTMAM were narrower than the dispersion prepared with stabiliser alone which contained a large proportion of both large and small particles.

EXAMPLE 13

Viscosities at 20° C. at the polymer dispersions from Examples 3–9 were obtained from samples both prior to and after distillation using a Brookfield RVT Viscometer at 20 rpm. These were compared to viscosities of products made by emulsion polymerisation as in U.S. Pat. No. 3,284,393 using the same recipe and procedure given in Example 3 except various amounts (recorded as % based on weight of an aqueous monomer) of Span 80 (Sorbitan monooleate, an oil soluble low HLB water-in-oil emulsifier) were incorporated in the oil phase prior to dispersion of the aqueous monomer solution. An amount of Solvent Pale 60 oil corresponding to the amount of Span 80 used was substracted from that used in Example 3 to maintain the same concentration of polymer on a dry basis as that in the dispersion of Examples 3 to 9.

| | Before Distillation | | After Distillation | |
|---|---|---|---|---|
| | Solids Content (%) | Viscosity (cps) | Solids Content (%) | Viscosity (cps) |
| Dispersion | | | | |
| Example 3 | 25.6 | 25 | 54.8 | 80 |
| Example 4 | 25.6 | 25 | 54.7 | 80 |
| Example 5 | 25.6 | 27 | 54.3 | 84 |
| Example 6 | 25.6 | 32 | 54.6 | 104 |
| Example 7 | 25.6 | 40 | 54.8 | 128 |
| Example 8 | 25.6 | 30 | 54.3 | 82 |
| Example 9 | 25.6 | 25 | 54.5 | 80 |
| Emulsion (amount of Span 80) | | | | |
| 5 | 25.6 | 125 | 50.0 | 175 |
| 7 | 25.6 | 1363 | 50.0 | 2025 |
| 9 | 25.6 | 2000 | 50.0 | 2875 |
| 12 | 25.6 | 4500 | 50.0 | 4400 |
| 15 | 25.6 | 5600 | 50.0 | 5575 |

The high viscosity obtained by emulsion polymerisation is undesirable.

EXAMPLE 14

An aqueous monomer solution comprising acrylamide (82.4 gms), sodium acrylate (35.2 gms), pentasodium diethylenetriamine pentaacetate (0.45 gms) and water (166.1 gms) was prepared and the pH of the solution adjusted to 7.0.

A non-aqueous continuous phase comprising Solvent Pale 60 oil (115.4 gms), Shell SBP11 (107.3 gms) and a 6:1 molar ratio copolymer of ceto-stearyl methacrylate and trimethyl-β-methacryloxy-ethylammonium methosulphate as stabiliser (13.2 gms) was prepared.

The suspension was produced by the same method given in Example 3 and was polymerised by adding tertiarybutyl hydroperoxide (0.007 gms) followed by sulphur dioxide (0.005 gms) dissolved in Shell SBP11 (6 mls) added continuously over a period of 20 minutes. The resulting polymer gel suspension was then distilled in the same manner as that of Example 3.

EXAMPLE 15

A polymer dispersion was prepared by the method given in Example 14 but sodium lauryl sulphate (SLS) (5.7 gms) was dissolved in the aqueous monomer solution prior to formation of the suspension.

EXAMPLE 16

Samples of the dispersions from Examples 14 and 15 were centrifuged at 1,250 g for 30 minutes and the degree of settlement determined by weighing the sediment.

| Example No. | Concentration of stabiliser (% on wt. of aqueous monomer droplets) | Concentration of SLS (% on weight of aqueous monomer solution) | Solids separated (% of total solids) |
|---|---|---|---|
| 14 | 3.0 | 0 | 93.7 |
| 15 | 3.0 | 2.0 | 17.0 |

EXAMPLE 17

Acrylamide/sodium acrylate copolymer dispersions were prepared according to the method given in Example 14 but various water soluble anionic surfactants were added to the aqueous monomer solution prior to formation of the suspension. The concentration at each anionic compound added was 2% by weight on weight of aqueous monomer solution. The distilled dispersions and dilutions of them with SBP11 were centrifuged at 1250 g for 30 minutes to determine their settlement stability.

| | Dispersion at 50% solids in Pale Oil 60 (PO60) | | Dispersion at 40% solids in 67/33 PO60/SBP11 w/w | | Dispersion at 25% solids in 33/67 PO60/SBP11 w/w | |
|---|---|---|---|---|---|---|
| Additive | % Settlement | Viscosity (cps) | % Settlement | Viscosity (cps) | % Settlement | Viscosity (cps) |
| None | 7.8 | 395 | 25.4 | 75 | 118.6 | 11 |
| A | 10.9 | 275 | 15.7 | 70 | 106.5 | 10 |
| B | 5.2 | 335 | 15.1 | 75 | 109.9 | 11 |
| C | 4.2 | 195 | 11.2 | 75 | 103.7 | 9 |
| D | 2.5 | 375 | 4.4 | 80 | 64.2 | 11 |
| E | 2.5 | 290 | 9.5 | 75 | 98.6 | 10 |
| F | 8.6 | 280 | 17.7 | 75 | 108 | 10 |
| G | 7.5 | 300 | 12.2 | 75 | 100.4 | 10 |

A — lauryl ether (4 moles ethylene oxide) sulphate sodium salt.
B — di-octyl sulphosuccinate sodium salt.
C — dodecyl benzene sulphonic acid sodium salt.
D — sesqui-phosphate ester of 2 mole ethoxylated tridecanol sodium salt.
E — di-hexyl sulphosuccinate sodium salt.
F — sodium octanoate.
G — 50/50 w/w blend of sodium 2-ethylhexyl sulphate and sodium methyl isobutyl carbinol sulphate.

EXAMPLE 18

Acrylamide/trimethyl-B-acryloxyethammonium chloride copolymer dispersions were prepared by the method given in Example 3 using various water soluble cationic surfactants as additives to the aqueous monomer solution prior to formation of the suspension. The distilled dispersions and dilutions of them with SBP11 were centrifuged at 1,250 g for 30 minutes to determine their settlement stability.

| Additive | Concentration of additive % on weight of aqueous monomer solution | Dispersion at 50% solids in Pale Oil 60 (PO60) | | 40% solids in 67/33 - PO60/SBP11 w/w | | Dispersion at 25% solids in 33/67 -PO60/SBP11 w/w | |
|---|---|---|---|---|---|---|---|
| | | % Settlement | Viscosity (cps) | % Settlement | Viscosity (cps) | % Settlement | Viscosity (cps) |
| None | — | 7.4 | 245 | 52.9 | 60 | 138.4 | 10 |
| H | 0.5 | 3.8 | 395 | 21.1 | 75 | 118.1 | 10 |
| I | 0.5 | 3.4 | 465 | 25.1 | 80 | 123.7 | 10 |
| J | 0.5 | | | 24.1 | 80 | | |
| | 1.0 | | | 13.3 | 85 | | |
| K | 1 | | | 16.9 | 80 | | |
| L | 1 | | | 16.8 | 80 | | |
| M | 0.5 | | | 29.6 | 75 | | |
| N | 0.5 | 6.0 | 180 | 42.7 | 40 | 120.1 | 10 |
| O | 1.0 | 5.6 | 395 | 30.7 | 70 | 133.8 | 10 |

-continued

| Additive | Concentration of additive % on weight of aqueous monomer solution | Dispersion at 50% solids in Pale Oil 60 (PO60) | | 40% solids in 67/33 -PO60/ SBP11 w/w | | Dispersion at 25% solids in 33/67 -PO60/ SBP11 w/w | |
|---|---|---|---|---|---|---|---|
| | | % Settlement | Viscosity (cps) | % Settlement | Viscosity (cps) | % Settlement | Viscosity (cps) |
| P | 0.6 | 8.6 | 320 | 18.9 | 55 | 88.7 | 10 |

H — Octyl trimethylammonium chloride
I — Decyl trimethylammonium chloride
J — Dodecyl trimethylammonium chloride
K — Hexadecyl trimethylammonium chloride
L — Octadecyl trimethylammonium chloride
M — Di-dodecyl dimethylammonium chloride
N — Dodecyl benzyl trimethyl ammonium chloride
O — 15 mole ethoxylate of tallow amine quaternised with benzyl chloride
P — Coco- dimethyl amine hydrochloride Viscosity is affected by factors other than the ionic additive and does not affect settlement stability. The meaningful results therefore are those where the systems have been diluted sufficiently for the effect of variations in viscosity to be small or minimal. Examples 17 and 18 thus show that additives D,E, J and P are particularly effective and that all the additives give a useful improvement.

We claim:

1. A reverse phase suspension polymerisation process in which an aqueous solution of polymerisable material is dispersed as droplets in a water immiscible liquid containing a suspension polymerisation stabiliser and the polymerisable material is polymerised in the droplets to form a dispersion in the non-aqueous liquid of aqueous polymer droplets and in which the stabilizer is ionic or potentially ionic, the polymerisable material comprises polymerisable material that is ionic having a charge type opposite to that of the stabiliser; characterised in that the dispersion of the said aqueous solution of polymerisable material into the water immiscible liquid is conducted in the presence of a water soluble, substantially oil insoluble, non-polymerisable polar ionic organic compound, which is cationic or anionic having the same charge type as the polymerisable material and having at least one alkyl group containing at least 6 carbon atoms, said polar organic compound being added to the aqueous solution of polymerisable material prior to droplet formation, and said suspension stabiliser is a copolymer of hydrophilic and hydrophobic monomers.

2. A process according to claim 1, in which the said polar organic compound is a cationic compound containing an alkyl group of at least 6 carbon atoms and is present in an amount insufficient to neutralise the ionic groups of the stabiliser.

3. A process according to claim 1, in which the said polar organic compound is a compound of the formula

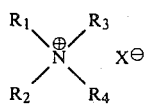

where
$R_1 = C_6-C_{18}$ alkyl and $C_{8-18}$ alkyl substituted benzyl
$R_2 = H$, $CH_3$, benzyl or, if $R_1$ is $C_6-C_{12}$ alkyl, $C_2-C_{12}$ alkyl
$R_3$ and $R_4 = H$, $CH_3$, benzyl or $(CH_2CH_2O)_nCH_2CH_2OH$ where $n=0-15$ x is an anion derived from quaternisation or salt formation.

4. A process according to claim 1, in which the said polar organic compound is selected from dodecyl-trimethylammonium chloride, coco-dimethylamine hydrochloride and coco-trimethyl-ammonium chloride, and the polymerisable material is cationic.

5. A process according to claim 1, in which the said polar organic compound is a compound selected from compounds of the formulae

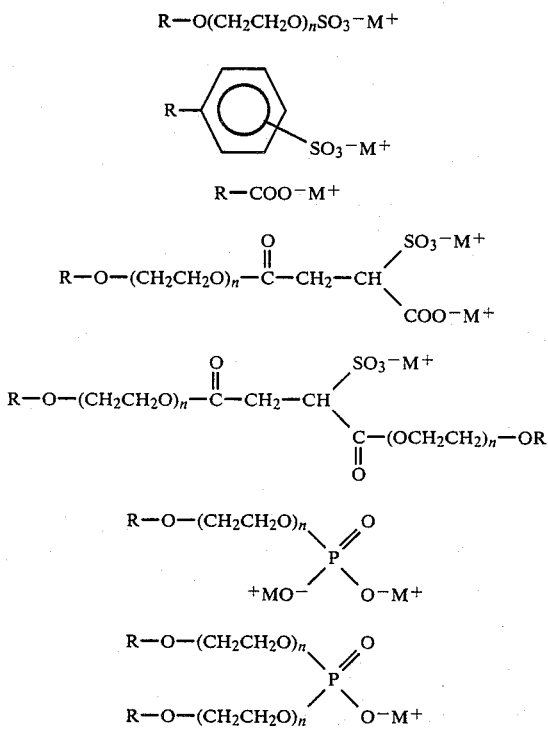

where
$R = C_6-C_{18}$ alkyl or alkyl substituted benzene
$n = 0-15$
$M = Na$, K, Li, $NH_4$ or a lower aliphatic amine or hydroxyethyl amine.

6. A process according to claim 1, in which the said polar organic compound is selected from sodium 2-ethylhexyl sulphate, sodium isodecyl sulphate, sodium lauryl sulphate and disodium dodecyl sulphosuccinate, sesquiphosphate esters of ethoxylated tridecanol sodium salts and di-hexyl sulphosuccinate sodium salt.

7. A process according to claim 1, in which the ionic polymerisable material is selected from quaternary ammonium and inorganic salts of dialkylaminoethylacrylates, dialkylaminoethyl-methacrylates, and acrylic acid.

8. A process according to claim 1 comprising the subsequent step of removing water from the droplets by subjecting the dispersion to azeotropic distillation.

9. A process according to claim 1, in which the suspension stabiliser is a copolymer of an alkyl acrylate or methacrylate with either acrylic or methacrylic acid or a dialkylamino-alkyl-acrylate, methacrylate or quaternary ammonium or inorganic salt thereof.

* * * * *